Jan. 17, 1939.  B. J. HUMPHREY  2,144,495
COMPOSITE ARTICLE AND METHOD OF MAKING THE SAME
Filed June 10, 1935
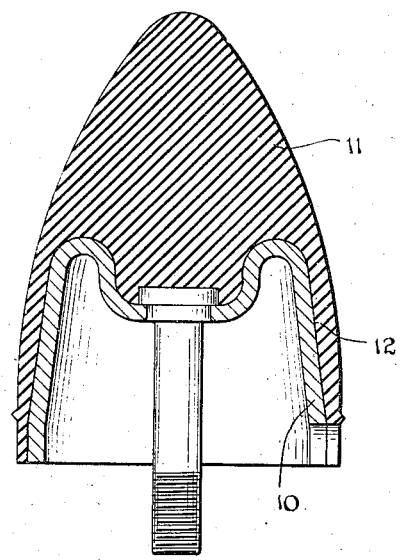
INVENTOR
Bingham J. Humphrey
BY  Albert L. Ely
ATTORNEY Patented Jan. 17, 1939

2,144,495

UNITED STATES PATENT OFFICE 2,144,495

COMPOSITE ARTICLE AND METHOD OF MAKING THE SAME

Bingham J. Humphrey, Akron, Ohio, assignor to The Firestone Tire & Rubber Company, Akron, Ohio, a corporation of Ohio Application June 10, 1935, Serial No. 25,740

16 Claims. (Cl. 18—59)

This invention relates to composite articles and to methods of making the same, and more especially it relates to composite articles composed of rubber and other materials, such as iron, steel, zinc, brass, aluminum and the like, and to procedure for securing a superior bonding of the rubber to said material.

The problem of obtaining a firm bonding of rubber to metal or other material is of long standing in the rubber industry, and various solutions have been advanced, most of which are open to some objection in that they are not susceptible to universal application. Excellent adhesion of rubber to metal is obtained when the rubber is vulcanized to a surface that has been brass-plated, but in some situations, as in the lining of large vats and tank cars, it is not feasible to brass-plate the metal. Another proposed method comprises the application of bonding material to unvulcanized sheet rubber, and then applying the treated sheet to the metal and then vulcanizing the rubber. This method is open to two objections, namely, that it is impossible to apply the sheet to complicated metal shapes, and if the rubber flows during vulcanization, that portion thereof that flows onto the metal has little or no adhesion thereto. Another class of bonding agents are thermoplastic in their final form and therefore cannot be used in installations that are subject to high degrees of heat.

The chief objects of the invention are to obtain adhesion of rubber to metal at least as strong as the tearing strength of the rubber; to provide an improved adhesive for bonding rubber to metal; to provide an improved method of bonding rubber to metal; to provide conveniently for applying a rubber coating to metal having an irregular or complicated surface profile; to effect the bonding of rubber to metal without requiring the metal first to be brass-plated; and to provide a rubber to metal bond that is not affected by heat. The invention further contemplates economies of time and labor in the production of composite articles comprising rubber. Other objects will be manifest as the specification proceeds.

The single figure of the accompanying drawing, which is for illustrative purposes only, shows a composite article of metal and rubber, in the manufacture of which the invention is advantageously employed.

The invention consists essentially in the use of a bonding film of novel composition for adhering the rubber to the metal, and in a novel method of applying and treating the film before the rubber is applied thereto. Said bonding film is composed of certain synthetic resins admixed with rubber stock in solution, the composition of which subsequently will be set forth. Preferably said synthetic resins are of the class known as synthetic drying oils known and marketed under the name of "S. D. O." The latter is prepared by the polymerization of divinyl-acetylene

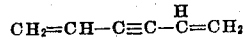

Mono-vinyl-acetylene $CH_2=CH—CH\equiv CH$ or its homologs may be employed with substantially similar results.

"S. D. O." is a non-volatile liquid, soluble in such common solvents as toluene, xylene, and solvent naphtha. It has the property of drying out rapidly into a hard, somewhat brittle, resinous solid. It absorbs oxygen from the air similar to a natural drying oil, but much more rapidly, and concurrently polymerizes to form a hard, inelastic resin. No organic solvent for this resin has been found. It is also impervious to moisture and resistant to acids, alkalies, and corrosive agents. The hard resin is amorphous with a specific gravity of 1.0. It is not thermoplastic and is unaffected by temperatures up to 392° F. (200° C.), but at higher temperatures thermal decomposition sets in.

The bonding film aforementioned is made by admixing partially polymerized divinyl-acetylene referred to as S. D. O. with a dissolved rubber stock of the following composition:

| | Parts |
|---|---|
| Sulphur | 3 |
| Magnesium oxide | 10 |
| Zinc oxide | 10 |
| Carbon | 3 |
| Rubber (smoked sheet) | 74 |

A solution of the above rubber composition is prepared by completely dissolving 100 grams thereof in 500 cc. of solvent naphtha or benzol. To 500 cc. of this cement is added 100 cc. of a 60% naphtha solution of S. D. O. and the solution thoroughly admixed by stirring. Before use, the foregoing bonding mixture is diluted with an equal volume of naphtha.

The bonding film described may be applied to most any material. On metal the best results are obtained on surfaces that are dry and free from any dirt, rust, grease or oil. In applying the bonding film to the metal, a brush or swab may be used, or the metal may be dipped or sprayed. If more than one coating is required to obtain a film of proper thickness, succeeding coats are applied before the preceding coat has hardened. The bonding film is then preferably dried, which drying, if effected at room temperature, requires from two to six hours. The drying operation may be expedited by the application of heat, and may be accomplished in from 15 to 45 minutes by heat at 85° C. (185° F.). The presence of magnesium oxide in the film accelerates the drying thereof. Other driers may be added for this purpose, such as cobalt oleate, manganese, linoleate, lead oleate and the like.

During drying a thermo-plastic resin is formed in the bonding film, and it is extremely important that the succeeding operation be started immediately after polymerization of this resin begins, otherwise the polymerization may proceed to such an extent that rubber will not adhere to the bonding film.

A desirable added step in the method consists in coating the bonding film, before applying an unvulcanized rubber covering thereto, with a substance, such as a cement, which is capable of adhering to both the bonding film and to the rubber.

For example, such a cement may be composed of the following ingredients:

| | Parts |
|---|---|
| Sulphur | 3 |
| Magnesium oxide | 10 |
| Zinc oxide | 10 |
| Carbon | 3 |
| Rubber | 74 |

Completely dissolve 100 grams of the above rubber stock in 1000 cc. of naphtha. If a coating of cement is to be applied to the bonding film, it is applied as soon as the bonding film reaches the critical point mentioned, the said cement retarding further polymerization of the resin. After the said cement has dried, the unvulcanized rubber may be applied to the coated metal, and the assembled structure subjected to vulcanizing heat, preferably under pressure in a mold.

In place of the cement mentioned, a thin layer of unvulcanized rubber called "tie gum" may be employed, which tie gum is composed of the same ingredients as the cement, but without the solvent. The invention also contemplates that the cement or tie gum may be dispensed with and the layer of unvulcanized rubber applied directly to the bonding film. In any case the cement, tie gum, or rubber layer is applied as soon as the bonding film reaches the critical point mentioned.

During the vulcanizing period, the thermoplastic resin formed in the bonding film becomes liquid and forms a firm bond with the metal. Thereafter continued polymerization takes place with the result that the resin eventually ceases to be thermoplastic. Thus subsequent heating of the structure does not destroy the bond between the rubber and metal. Tests show that the bond between the rubber and metal is as strong as the tearing strength of the rubber even at temperatures approximating 400° F.

Referring now to the drawing, there is shown a composite article comprising a metal base structure 10 and a rubber structure 11 vulcanized to one surface thereof through the agency of the improved bonding material herein described. Said bonding material is applied to the outer surface of the base structure, indicated at 12, in the manner described, and is practically non-discernible in the finished article after vulcanization. Because of the complicated profile of the surface of the base 10, consisting as it does of curved surfaces generated from a number of different axes, this and similar structures can be satisfactorily covered with rubber by means of this invention, whereas it would be practically impossible to do so by methods involving the use of rubber with the bonding film initially adhered to said rubber.

In addition to effectively adhering natural rubber to metal, the invention may be employed with synthetic rubber, for instance a product commercially known as "Duprene", polymerized chloro-butadiene, consequently the term "rubber" used herein contemplates the use of artificial or synthetic as well as natural rubber.

Modification may be resorted to without departing from the spirit of the invention or the scope of the appended claims, which are not limited wholly to the specific ingredients set forth or the exact procedure described.

What is claimed is:

1. A composite article consisting of rubber and another material bonded to each other by an intermediate film comprising a mixture of rubber and a synthetic drying oil, selected from the group consisting of divinyl-acetylene, mono-vinyl-acetylene and their homologs.

2. A composite article comprising vulcanized rubber and metal adhered to each other by a bonding material comprising a mixture of rubber and polymerized divinyl-acetylene.

3. The method of making a composite article of rubber and metal which includes applying to the surface of the metal a thin adherent coating comprising a mixture of rubber and a synthetic drying oil, selected from the group consisting of divinyl-acetylene, mono-vinyl-acetylene, and their homologs, drying said coating, applying a second coating of a substance capable of adhering both to the bonding film and to the rubber, and adhering a vulcanizable rubber composition to said coatings.

4. The method of making a composite article of rubber and metal which includes applying to the surface of the metal a thin adherent film comprising a mixture of rubber and a partially polymerized divinyl-acetylene, drying said film, and adhering a vulcanizable rubber composition thereto.

5. The method of making a composite article of rubber and metal which includes applying to the surface of the metal a thin adherent film comprising a mixture of rubber and partially polymerized divinyl-acetylene, drying said film, applying to said film a coating of a substance capable of adhering both to the rubber and to said film, and then adhering a vulcanizable rubber composition to said coating.

6. The method of making a composite article of rubber and metal which includes applying to the metal a thin adherent film comprising a mixture of rubber and a synthetic drying oil, selected from the group consisting of divinyl-acetylene, mono-vinyl-acetylene, and their homologs, drying said film until a thermo-plastic resin forms therein and polymerization of the resin begins, coating said film with a substance capable of adhering both to the rubber and to said film, and vulcanizing rubber composition in contact with said coated film.

7. The method of making a composite article of rubber and metal which includes applying to the surface of the metal a coating comprising a mixture of rubber and a synthetic drying oil, selected from the group consisting of divinyl-acetylene, mono-vinyl-acetylene, and their homologs, and adhering a vulcanizable rubber composition to said coating.

8. The method of making a composite article of rubber and metal which includes applying to the metal an adherent film comprising a mixture of rubber and a synthetic drying oil, selected from the group consisting of divinyl-acetylene, mono-vinyl-acetylene, and their homologs, treating said film until a thermo-plastic resin forms therein and polymerization of said resin begins, applying a rubber composition to said film, and subjecting the assembled structure to pressure and vulcanizing heat.

9. The method of bonding rubber to metal which includes applying to the metal an adherent film comprising a mixture of rubber and partially polymerized divinyl-acetylene, treating said film until a thermo-plastic resin forms therein and polymerization of the resin begins, and vulcanizing a body of rubber composition in pressure contact with said film.

10. The method of bonding rubber to metal which includes applying to the metal an adherent film comprising a mixture of rubber and partially polymerized divinyl-acetylene, treating said film until a thermo-plastic resin forms therein and polymerization of the resin begins, coating said film with a viscous cement comprising rubber and a volatile solvent, then applying a body of vulcanizable rubber composition to the coated film, and subjecting the assembled structure to pressure and vulcanizing heat.

11. A composite article consisting of rubber and metal bonded to each other by a film comprising a mixture of rubber, partially polymerized divinyl-acetylene, and magnesium oxide.

12. A composite article consisting of rubber and metal bonded to each other by a film comprising a mixture of rubber, partially polymerized divinyl-acetylene, and a dryer including magnesium oxide, cobalt oleate, manganese linoleate, lead oleate or the like.

13. The method of making a composite article of rubber and metal which includes applying to the surface of the metal a coating comprising a mixture of rubber, a synthetic drying oil, selected from the group consisting of divinyl-acetylene, mono-vinyl-acetylene, and their homologs, and magnesium oxide, drying said coating, and adhering a vulcanizable rubber composition to said coating.

14. The method of making a composite article of rubber and metal which includes applying to the surface of the metal a coating comprising a mixture of rubber, a synthetic drying oil, selected from the group consisting of divinyl-acetylene, mono-vinyl-acetylene, and their homologs, and a dryer including magnesium oxide, cobalt oleate, manganese linoleate, lead oleate or the like, drying said coating, and adhering a vulcanizable rubber composition to said coating.

15. The method of making a composite article of rubber and metal which includes applying to the surface of the metal a coating comprising a mixture of rubber and a partially polymerized synthetic drying oil, selected from the group consisting of divinyl-acetylene, mono-vinyl-acetylene, and their homologs, permitting said coating to absorb oxygen from the air to further polymerize said synthetic drying oil, and adhering a vulcanizable rubber composition to said coating.

16. The method of making a composite article of rubber and metal which includes applying to the surface of the metal a thin adherent coating comprising a mixture of rubber and a partially polymerized synthetic drying oil, selected from the group consisting of divinyl-acetylene, mono-vinyl-acetylene, and their homologs, permitting said coating to absorb oxygen from the air to further polymerize said synthetic drying oil, applying a second coating of a substance capable of adhering both to the bonding film and to the rubber, said second coating serving to retard further polymerization of said synthetic drying oil, and adhering a vulcanizable rubber composition to said coatings.

BINGHAM J. HUMPHREY.